(No Model.)

W. BALL.
FILTER.

No. 291,863.  Patented Jan. 15, 1884.

Witnesses
N. A. Clark.
P. B. Turpin.

Inventor
William Ball
By R. S. & A. P. Lacey
att'ys

UNITED STATES PATENT OFFICE.

WILLIAM BALL, OF LYNCHBURG, OHIO.

FILTER.

SPECIFICATION forming part of Letters Patent No. 291,863, dated January 15, 1884.

Application filed September 29, 1883. (No model.)

*To all whom it may concern:*

Be it known that I, WILLIAM BALL, a citizen of the United States, residing at Lynchburg, in the county of Highland and State of Ohio, have invented certain new and useful Improvements in Cisterns for the Purification of Water; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in filtering devices for reservoirs; and it consists in the construction, combination, and arrangement of the several parts, as will be hereinafter fully described, and pointed out in the claims.

Figure 1:
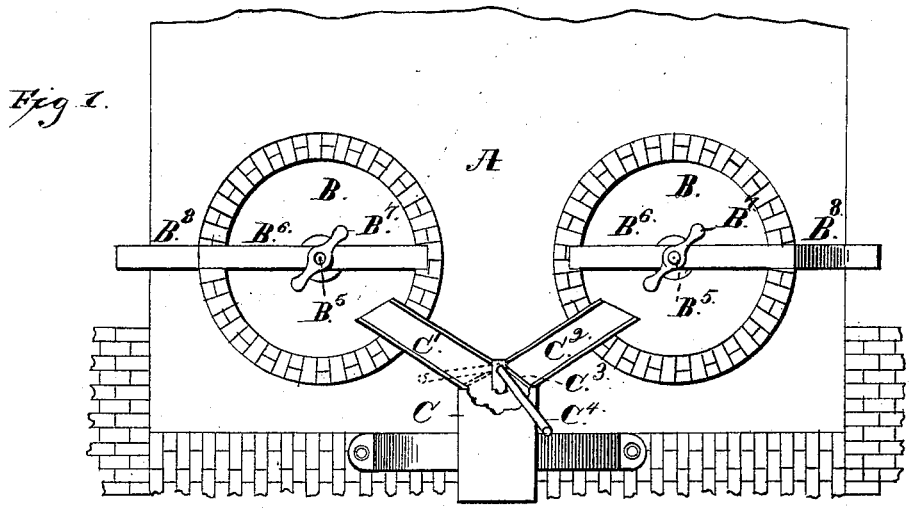
Figure 2:
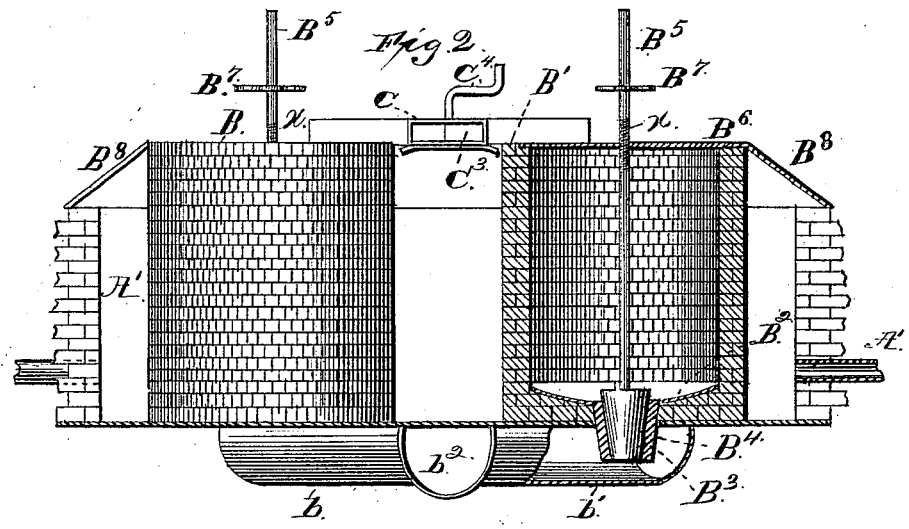
Figure 3:
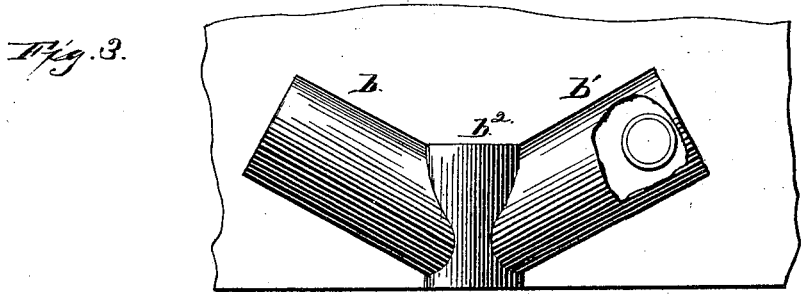

In the drawings, Figure 1 is a plan view, showing a section of the reservoir having the filtering receiving-tanks and feed-pipes, &c., in position. Fig. 2 is a cross-sectional view of the reservoir, showing one of the tanks in vertical section; and Fig. 3 is a detail view, showing the discharge-pipes leading from the filtering-tanks.

The reservoir A is provided with discharge-pipe A', or other suitable means may be employed whereby the water-supply may be drawn therefrom, as is well understood. At or near one end of this reservoir I build the filtering receiving-tanks B B', the upper ends of which extend above the high-water mark of the reservoir, in order to receive the feed-supply, and so that at no time the water in the tanks will pass into the reservoir, except by percolation through its walls, as will be described. The sides of these tanks are made of bricks, so that water will pass readily through them, and their bottoms $B^2$ are made of or provided with an imporous lining, as clearly shown in Fig. 2. Through the bottoms $B^2$, I form openings $B^3$, provided with pipes, which extend slightly below the reservoir into the pipes $b$ or $b'$, which converge and discharge into the single pipe $b^2$, as clearly shown in Figs. 2 and 3. This opening $B^3$ is smooth-tapered to receive the smooth-tapered plug $B^4$, which is provided with stem $B^5$, which extends upward in the tank and above the same, and is threaded, as shown at $x$, Fig. 2, to turn in threaded openings formed through the cross-bars $B^6$, which extend across or over the tanks, as shown. The upper ends of the stems are provided with suitable handles, $B^7$, whereby they may be turned to raise the plugs $B^4$, when it is desired to flush the filtering receiving-tanks, as will be readily understood. Bridges $B^8$ $B^8$ extend from the sides of the reservoir up onto the filtering receiving-tanks, so that the attendant will have ready access thereto to flush or close the said tanks, as desired.

The feed-pipe C leads to the reservoir at a point about in line with the space between the two tanks B B', and it is branched at its delivery end to form the two-way pipes or spouts C' $C^2$, one of which leads into tank B and the other into tank B', as clearly shown. At the juncture of these spouts C' $C^2$, I pivot the valve $C^3$, having handle or stem $C^4$, and movable, as clearly indicated in dotted lines, Fig. 1, in order to throw the feed-water into one or the other of the delivery-spouts C' $C^2$.

In operation, when the valve is straight between the branched spouts, water will be delivered into both tanks B B'. By adjusting said valve it may be made to throw the water all into one tank and shut off the other. The water percolates through the sides of the tanks, whence the filtered purified supply may be drawn, as set forth.

When the tanks have become foul or dirty, the plugs may be raised in the manner before described, and the tanks thoroughly flushed and cleaned.

The filtering receiving-tank is preferably made of bricks, as shown; but it will be understood that when so desired it might be built of other suitable porous material, and the same result might be attained.

Having thus described my invention, what I claim, and desire to secure by Letters Patent, is—

1. The combination, with the reservoir, of a filtering receiving-tank arranged therein, and having its upper end projected above the high-water mark, the said tank being constructed with porous walls and adapted to receive the supply of inflowing water in its upper end, substantially as described, and for the purposes specified.

2. The combination, with the reservoir and the filtering receiving-tanks arranged therein, of the feed-pipe having branches leading into said tanks, and provided with a valve at the juncture of said branches, whereby the inflowing water may be directed into one or both of the tanks, substantially as set forth.

3. In a reservoir, the combination of the filtering receiving tank or chamber, having porous sides and imporous base, and having a tapered discharge-opening formed through its said base, the cross-bar having threaded opening arranged above the discharge-opening, and the tapered plug turning in said discharge-opening and having its stem threaded, as described, and provided with a suitable lever or handle, substantially as set forth.

In testimony whereof I affix my signature in presence of two witnesses.

WILLIAM BALL.

Witnesses:
ISMA TROTH,
JOHN A. BERING.